(12) United States Patent
Kornfalt et al.

(10) Patent No.: US 8,448,399 B2
(45) Date of Patent: *May 28, 2013

(54) FLOOR STRIP

(75) Inventors: Sven Kornfalt, Malmo (SE); Per Bengtsson, Rostanga (SE); Hans Sjolin, Perstorp (SE); Oliver Stanchfield, Garner, NC (US)

(73) Assignee: Pergo (Europe) AB, Trelleborg (SE)

( * ) Notice: Subject to any disclaimer, the term of this patent is extended or adjusted under 35 U.S.C. 154(b) by 944 days.

This patent is subject to a terminal disclaimer.

(21) Appl. No.: 11/640,351

(22) Filed: Dec. 18, 2006

(65) Prior Publication Data

US 2007/0107344 A1    May 17, 2007

Related U.S. Application Data

(60) Division of application No. 11/140,075, filed on May 31, 2005, now Pat. No. 7,150,134, which is a division of application No. 10/902,062, filed on Jul. 30, 2004, now Pat. No. 7,065,931, which is a division of application No. 10/319,820, filed on Dec. 16, 2002, now Pat. No. 6,898,911, which is a continuation-in-part of application No. 08/817,391, filed as application No. PCT/SE95/01206 on Oct. 17, 1995, now Pat. No. 6,517,935, said application No. 10/319,820 is a continuation-in-part of application No. 09/986,414, filed on Nov. 8, 2001, now abandoned.

(30) Foreign Application Priority Data

Oct. 24, 1994 (SE) ..................... 9403620

(51) Int. Cl.
*E04B 1/62* (2006.01)

(52) U.S. Cl.
USPC .............................................. 52/395; 52/461

(58) Field of Classification Search
USPC ............... 52/395, 461, 468, 465, 467, 464, 52/471

See application file for complete search history.

(56) References Cited

U.S. PATENT DOCUMENTS

| 1,357,713 A | 11/1920 | Lane |
| 2,100,238 A | 11/1937 | Burgess |

(Continued)

FOREIGN PATENT DOCUMENTS

| DE | 3640822 | 6/1988 |
| DE | 467150 | 6/1992 |

(Continued)

OTHER PUBLICATIONS

U.S. Patent Application Publication No. 2003/0154678, published Aug. 21, 2003 with copy of Office Action mailed Feb. 18, 2004, Stanchfield.

(Continued)

*Primary Examiner* — Basil Katcheves
(74) *Attorney, Agent, or Firm* — Novak Druce Connolly Bove + Quigg (57) ABSTRACT

A thin decorative thermosetting laminate of postforming quality is glued to a longitudinal carrier to form a floor strip. The laminate has a thermosetting resin as well as hard particles impregnated therein to increase the abrasion resistance of the laminate. The carrier generally has a cross section of a dilatation, transition or a finishing profile, depending on the intended use of the floor strip. The floor strip has a tab portion on a surface that engages a channel on a floor tile or a reducer. The tab portion locks the floor strip into place and prevents movement of the floor tile or the reducer with respect to the floor strip.

33 Claims, 6 Drawing Sheets

U.S. PATENT DOCUMENTS

| | | | |
|---|---|---|---|
| 2,194,086 A | 3/1940 | Horn | |
| 2,363,429 A | 11/1944 | Lowry | |
| 3,162,906 A | 12/1964 | Dudley | |
| 3,199,258 A | 8/1965 | Jentoft et al. | |
| 3,286,425 A | 11/1966 | Brown | |
| 3,296,056 A | 1/1967 | Bechtold | |
| 3,331,171 A | 7/1967 | Hallock | |
| 3,339,329 A | 9/1967 | Berg | |
| 3,363,381 A | 1/1968 | Forrest | |
| 3,411,977 A | 11/1968 | Slater, Jr. | |
| 3,488,828 A | 1/1970 | Gallagher | |
| 3,665,666 A | 5/1972 | Delcroix | |
| 3,671,369 A | 6/1972 | Kvalheim et al. | |
| 3,696,575 A | 10/1972 | Armstrong | |
| 3,745,726 A | 7/1973 | Thom | |
| 3,758,650 A | 9/1973 | Hurst | |
| 3,760,544 A | 9/1973 | Hawes et al. | |
| 3,810,707 A | 5/1974 | Tungseth et al. | |
| 4,067,155 A | 1/1978 | Ruff et al. | |
| 4,198,455 A | 4/1980 | Spiro et al. | |
| 4,292,774 A | 10/1981 | Mairle | |
| 4,455,803 A | 6/1984 | Kornberger | |
| 4,461,131 A | 7/1984 | Pressell | |
| 4,504,347 A | 3/1985 | Munk et al. | |
| 4,520,062 A | 5/1985 | Ungar et al. | |
| 4,643,237 A | 2/1987 | Rosa | |
| 5,034,272 A * | 7/1991 | Lindgren et al. | 428/331 |
| 5,074,089 A | 12/1991 | Kemmer et al. | |
| 5,155,952 A | 10/1992 | Herwegh et al. | |
| 5,288,540 A | 2/1994 | Albrinck et al. | |
| 5,365,713 A | 11/1994 | Nicholas et al. | |
| 5,451,451 A * | 9/1995 | Minnick | 442/247 |
| 5,581,967 A | 12/1996 | Glatz | |
| 5,888,017 A | 3/1999 | Corrie | |
| 6,141,920 A | 11/2000 | Kemper | |
| 6,158,915 A | 12/2000 | Kise | |
| 6,219,982 B1 | 4/2001 | Eyring | |
| 6,230,385 B1 | 5/2001 | Nelson | |
| 6,253,514 B1 | 7/2001 | Jobe et al. | |
| 6,345,480 B1 | 2/2002 | Kemper | |
| 6,421,970 B1 | 7/2002 | Martensson et al. | |
| 6,517,935 B1 | 2/2003 | Kornfalt et al. | |
| 6,588,165 B1 | 7/2003 | Wright | |
| 2002/0127374 A1 | 9/2002 | Spratling | |
| 2002/0148551 A1 | 10/2002 | Knauseder | |
| 2002/0189747 A1 | 12/2002 | Steinwender | |
| 2003/0118812 A1 | 6/2003 | Kornfalt et al. | |
| 2003/0159389 A1 | 8/2003 | Kornfalt et al. | |
| 2004/0031226 A1 | 2/2004 | Miller et al. | |
| 2004/0031227 A1 | 2/2004 | Knauseder | |
| 2004/0041225 A1 | 3/2004 | Nemoto | |

FOREIGN PATENT DOCUMENTS

| | | |
|---|---|---|
| DE | 29703962 | 4/1997 |
| DE | 19821938 | 11/1999 |
| DE | 10131248 | 1/2003 |
| SE | 467150 B | 6/1992 |
| WO | 9612857 | 5/1996 |
| WO | 9901628 | 1/1999 |
| WO | 0120101 | 3/2001 |
| WO | 03093686 | 11/2003 |

OTHER PUBLICATIONS

U.S. Appl. No. 10/360,802, filed Feb. 10, 2003.

* cited by examiner

FLOOR STRIP

CROSS REFERENCE TO RELATED APPLICATIONS

This application is a division of U.S. Ser. No. 11/140,075, which is a division of U.S. Ser. No. 10/902,062, filed Jul. 30, 2004 (now U.S. Pat. No. 7,065,931), which, in turn, is a division of U.S. Ser. No. 10/319,820, filed Dec. 16, 2006 (now U.S. Pat. No. 6,898,911), which, in turn, is a continuation-in-part of U.S. Ser. No. 08/817,391, filed Apr. 25, 1997 (now U.S. Pat. No. 6,517,935), which is a 35 U.S.C. §371 national phase application of International Application PCT/SE95/01206, filed Oct. 17, 1995, claiming benefit of Swedish priority application 9403620, filed Oct. 24, 1994, and a continuation-in-part of U.S. Ser. No. 09/986,414, filed Nov. 8, 2001, the entire disclosures of which are hereby incorporated by reference.

BACKGROUND OF INVENTION

1. Field of the Invention

The present invention relates to a process for the production of a floor strip such as a dilatation profile, a transition profile or a finishing profile. The present invention also relates to the features of the floor strip.

2. Description of the Related Art

It is previously known to produce floor strips such as metal strips, wood veneer coated strips and strips of homogeneous wood. However, such floor strips generally do not adequately match the pattern of the other portions of the floor. Thus, there is a strong desire to bring about a floor strip with the same pattern as on a floor of thermosetting laminate. During the last few years these floors have become very usual. For instance they are made with a wood pattern, marble pattern and fancy pattern. Possibly you can use a homogeneous wood strip or a wood veneer-coated strip for a few of the wood patterned floors. Previously known strips do not go well together with all the other floor patterns.

These floor strips are provided in a floor system in order to provide a transition or edge to the floor, such as at the corner of the wall or between rooms. They may also be provided between rooms having different types of flooring, such as carpet and tile, or different heights or textures of tiles. However, conventional floor strips do not adequately provide a transition between differing floor types because they cannot adequately cover the gap between the differing floor coverings or the differing heights of the tiles.

However, it also a problem for sellers of floor strips to inventory differing types of transition profiles, especially in a pattern or color to match a single floor. Thus, there exists a need to provide a single floor strip which can satisfy a number of differing requirements, such a being useful as a finishing profile, a dilatation profile, and a transition profile.

SUMMARY OF INVENTION

The purpose of the present invention is to provide a floor strip with improved abrasion resistance and features to overcome the problems in the art.

According to the present invention it has quite surprisingly been possible to meet the above needs and bring about a process for the production of floor strips such as a dilatation profile, a transition profile or a finishing profile. The process comprises glueing, preferably under heat and pressure a thin decorative thermosetting laminate of post-forming quality having an abrasion resistance measured as IP-value>3000 revolutions, preferably >6000 revolutions, on a longitudinal carrier, which carrier preferably consists of a fibre board or a particle board with a rectangular cross-section and at least two opposite rounded-off edges.

The post-forming laminate is glued in one piece on the upper side and two long sides of the carrier via the rounded-off edges, whereupon one or more floor profiles having the same or different cross-section is machined from the laminate coated carrier. According to another embodiment the carrier can be provided with a rectangular cross-section with three rounded-off edges.

From the same body, the laminate clad carrier, several profiles with varying shape can be machined. Usually a milling machine is used for machining the different kinds of profiles from the laminate coated carrier. The carrier may also be molded to achieve various profiles which may be required. Additionally, the carrier is preferably water resistant or even waterproof. In a preferred embodiment the carrier consists of a high density fibre board made of fine fibres, such as known in the industry as medium density fiberboard (MDF) or high density fiberboard (HDF).

Advantageously, a heat and moisture resistant glue is used at the glueing. Preferably the glueing is carried out under heat and pressure. For instance, the pressure can be regulated by means of rollers which press the laminate against the carrier. The temperature can, for instance, be regulated with heating nozzles which can give an even current of warm air.

Suitably the post-forming laminate consists of at least one monochromatic or patterned paper sheet impregnated with a thermosetting resin, preferably melamine-formaldehyde resin and preferably one or more sheets for instance of parchment, vulcanized fibres or glass fibres. The last mentioned sheets are preferably not impregnated with any thermosetting resin, but the thermosetting resin from the sheets situated above will enter these sheets at the laminating step, where all sheets are bonded together. Alternatively, the sheet can be a metallic foil or a layer of paint.

Generally the term post-forming laminate means a laminate which is so flexible that it can be formed at least to a certain extent after the production thereof. Ordinary qualities of thermosetting decorative laminates are rather brittle and cannot be regarded as post-forming laminates.

Usually the post-forming laminate includes at least one uppermost transparent paper sheet made of $\alpha$-cellulose and impregnated with a thermosetting resin, preferably melamine-formaldehyde resin. This so-called overlay is intended to protect an underlying decor sheet from abrasion.

Often at least one of the paper sheets of the postforming laminate impregnated with thermosetting resin, preferably the uppermost one, is coated with hard particles, e.g., those having a Moh's hardness of at least 6, preferably between 6 and 10, similar to the Moh's hardness of at least silica, aluminium oxide, diamond and/or silicon carbide. The hard particles have an average particle size of about 1-80 µm, preferably about 5-60 µm evenly distributed over the surface of the paper sheet. In a preferred embodiment the hard particles are applied on the resin impregnated paper surface before the resin has been dried. The hard particles improve the abrasion resistance of the laminate. Hard particles are used in the same way at the production of laminates which are subject to a hard wear such as flooring laminates.

The abrasion resistance of the post-forming laminates is tested according to the European standard EN 438-2.6: 1991. According to this standard the abrasion of the decor sheet of the finished laminate to the so-called IP-point (initial point) is measured, where the starting abrasion takes place. The IP-value suitably lies within the interval 3000-20000, preferably 3000-10000 revolutions. Thus, the manufacturing process according to the invention makes it possible to produce laminate clad profiles with the same surface pattern and about the same abrasion resistance as the laminate floorings they are intended to be used together with.

The carriers for the floor strips to which the post-forming laminate is glued can be made of differing profiles to accommodate the specific circumstance, namely whether a dilatation, transition or finishing profile is required. The profile, for example a dilatation profile, comprises a general T-shape whereby a first plane extending vertically along the length of the floor strip intersects about in the middle of a second horizontally oriented plane. A profile removes about half of the second plane to form a rotated upside down L-shape, which is used adjacent a wall or on a stepped surface. A dilatation profile is similar to a finishing profile, but the second plane is oriented off of horizontal or it is divided into two planes, one at a different level than the other, or one side is removed altogether, which provides a smoother transition between uneven tiles, a carpet and tile, or differing tile textures. The pattern of the profiles can also be adapted to other flooring materials than laminate floorings, such as parquette floorings and soft plastic floorings.

In order to overcome the problems associated with transitioning between carpet and tile, differing textures of tiles or differing heights of tiles, the second plane may have a tab portion on its tile/carpet engaging surface depending orthogonally away from the second plane and displaced away from the first plane. The tab is used to engage a reducer that extends between the floor surface and the engagement surface of the second plane. The reducer is configured to maintain a horizontal orientation of the second plane and provide a smoother transition between the tile surfaces in the finishing, transition or dilatation profile when they are used between uneven tile surfaces, differing tile textures or between carpet and tile. The tab portion fits into a groove on the upper surface of the reducer in mating fashion to create a solid lock between them.

Alternatively, the tab portion may be engaged into the edge of a tile panel on the floor. In this situation, the tiles adjacent to the transition area may require a groove cut into them near the transition. Such allows the tab portion to maintain a firm and locked relationship with the tile surface and provide a better transition between the tile surface and the respective profile. Further, a tab portion may be provided on both sides of the second plane respective to the first plane to further smooth the transition area between the first tile surface, the floor strip and the second surface.

The design of the tab may come in varying styles, there may be a straight block type tab, a t-nut type, various interlocking styles and a channel type arrangement. Such types depend on the particular requirements of the tiling circumstance.

This inventive floor strip according to the above may be used as a transition piece between various tongue and groove panels to provide a smooth and aesthetic transition between floor sections having dissimilar surfaces, such as those between a carpeted area and a tiled area, a thin tile area and a hardwood floor, two tile areas having differing textures, etc.

BRIEF DESCRIPTION OF THE DRAWINGS

The present invention will be explained further in connection with the embodiment example below and the enclosed figures of which.

DETAILED DESCRIPTION OF THE INVENTION

In the figures of illustrating a floor strip 100, the thickness of the post-forming laminate 1 has been magnified as compared to the size of the carrier 2 and the profiles, e.g. 3-5 respectively, to better illustrate that a post-forming laminate 1 is glued to the carrier 2 and the profiles 3-5 respectively. Of course the FIGS. 1-4 only show one embodiment of the carrier 2 and the profiles 3-5 respectively which can be produced according to the invention. Various other designs are possible as shown in the other drawing figures.

For example in one embodiment, a roll of transparent so-called overlay paper of α-cellulose with a surface weight of 25 g/m$^2$ is impregnated with an aqueous solution of melamine-formaldehyde resin to a resin content of 70 percent by weight calculated on dry impregnated paper. Immediately after the impregnation, aluminium oxide particles with an average particle size of 50 μm are applied to the upper side of the paper in an amount of 7 g/m$^2$ by means of a doctor-roll placed above the paper web. Thus, the hard aluminium oxide particles are then applied to the still-wet melamine-formaldehyde resin which has not dried.

The impregnated paper web is then fed continuously into a heating oven, where the solvent in the resin evaporates. Simultaneously, the resin is partially cured to so-called B-stage. Thereby the aluminium oxide particles are enclosed in the resin layer and accordingly concentrated to the surface of the product obtained which is usually called a prepreg. The prepreg web obtained is then rolled again.

A roll of conventional non-transparent decor paper with a decor pattern printed thereon and having a surface weight of 80 g/m$^2$ is treated in the same way as the overlay paper except for the fact that no aluminium oxide particles are applied and that the resin content was 50 percent by weight calculated on dry impregnated paper.

A roll of unimpregnated parchment with a surface weight of 120 g/m$^2$ is used at the production of the post-forming laminate.

The two prepreg webs impregnated with melamine-formaldehyde resin and the unimpregnated parchment web are then pressed between two press bands of a continuous laminating press to a decorative post-forming laminate. At the pressing, a prepreg web of α-cellulose is placed on top with the side with the hard particles directed upwards. Underneath follows a prepreg web of decor paper and at the bottom a web of parchment. The prepreg webs and the parchment web are pressed together at a pressure of 35 kp/cm$^2$ and at a temperature of 170° C. The decorative post-forming laminate obtained is then cut with roller knives to strips of suitable length and width.

Figure 1:
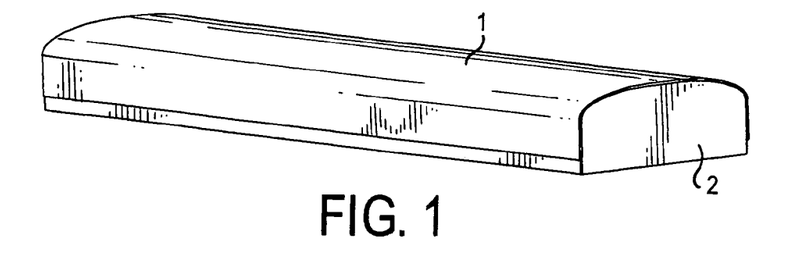
FIG. 1 illustrates a post-forming laminate glued to a longitudinal carrier.
Figure 2:
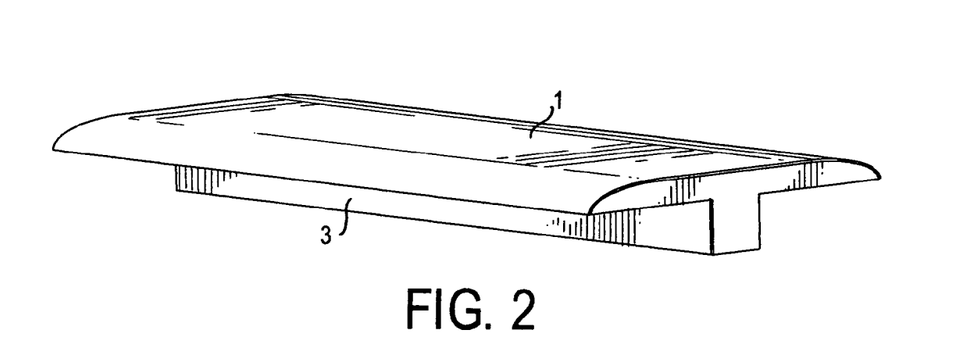
FIG. 2 illustrates a dilatation profile with a post-forming laminate glued thereto.
Figure 3:
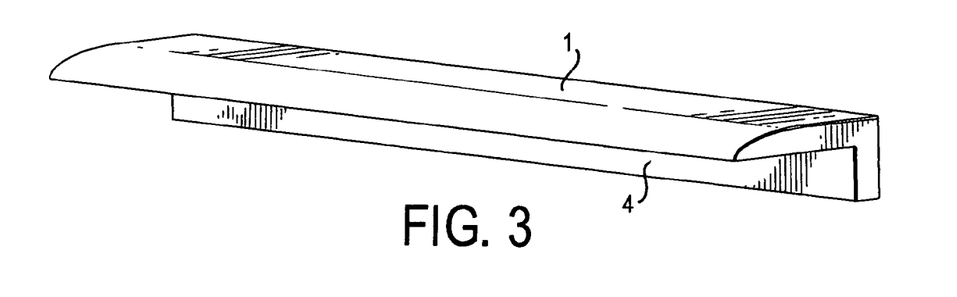
FIG. 3 illustrates a finishing profile with a post-forming laminate glued thereto.
Figure 4:
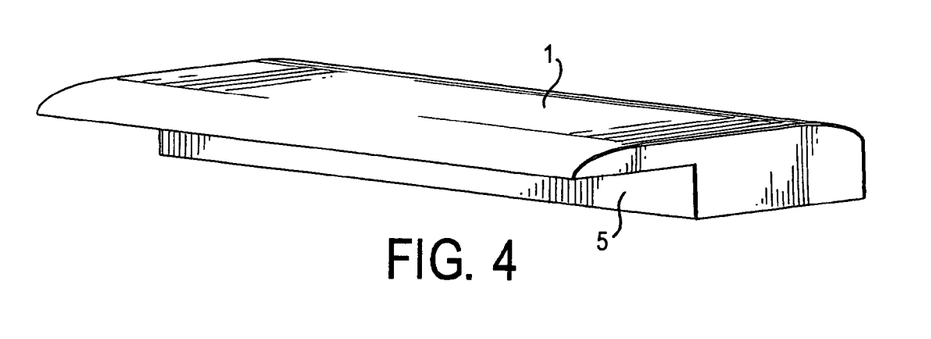
FIG. 4 illustrates a transition profile with a post-forming laminate glued thereto.

A longitudinal carrier 2 with a rectangular cross-section and two opposite rounded-off edges according to FIG. 1 are machined from a fibre board or other substrate material by means of a milling machine. The fibre board is a water resistant board of so-called MDF-quality (medium density fibre board quality) or, alternatively, HDF quality (high density fibre board quality), made of finely divided fibres with an adhesive to bond the fibres together.

A strip of post-forming laminate 1 is now glued under heat and pressure to the longitudinal carrier 2 with a heat and moisture resistant glue. The pressure is regulated with rolls which press the laminate against the carrier and the temperature 1 is regulated with heating nozzles which blow an even current of warm air.

Following the above process, the abrasion resistance of the post-forming laminate obtained was measured. Then a value for the IP-point amounting to 7000 revolutions was obtained.

The different structures and designs of the profiles for floor strip 100, namely the dilatation, finishing and transition will now be described with respect to FIGS. 2-9. A dilation profile 3 according to FIG. 2 can be machined from the laminate clad carrier by milling. Two finishing profiles 4 according to FIG. 3 or one transition profile 5 according to FIG. 4 can be produced from the same carrier. This results in a rational and cost-saving production. Alternatively, the carriers can be the shape as shown in FIGS. 2-9 before the post-forming of the laminate is commenced.

Figure 5:
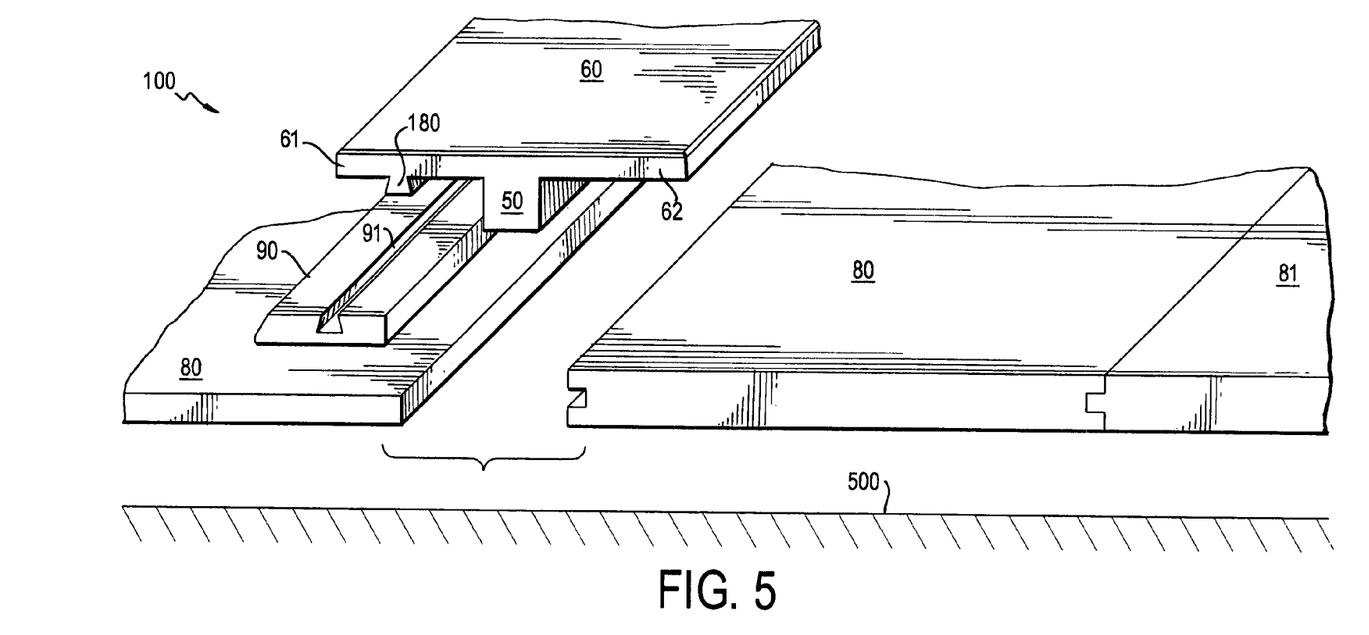
FIG. 5 illustrates an exploded view of a dilatation profile extending between uneven tile surfaces.
Figure 6A:
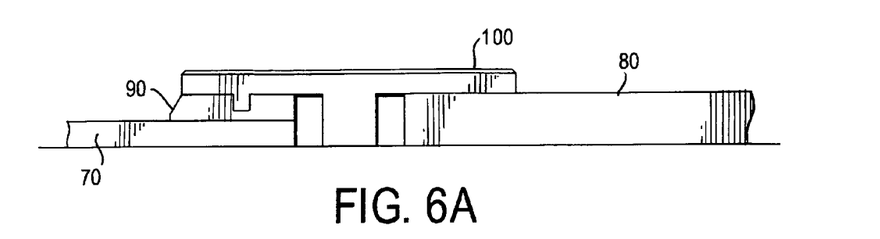
FIGS. 6A-6C illustrate an assembled view of a locking tab/reducer assembly.

FIG. 5 shows an exploded view of one of the preferred embodiments of the invention, wherein floor strip 100 is attached between two differing sets of tiles, thin tile 70 and thicker tongue and groove tiles 80 and 81 (shown in mating relationship), all on a subfloor 500. FIG. 6A shows the components of FIG. 5 assembled together. In these figures, floor strip 100 is a dilatation profile having a T-shape, with a first plane 50 arranged vertically in use and a second plane 60 oriented horizontally and connecting to the first plane along its mid-section forming a "T." The second plane overhangs the first plane on a first side 61 and a second side 62. A tab 180 extends from the bottom plane of first side 61 of the second plane.

Due to the differing heights of the tiles 70 and 80/81, a reducer 90 will be required to provide a smooth transition. Reducer 90 has a height corresponding to the height difference between the tiles and also has a groove 91 on its upper surface for acceptance, in a locking manner, of tab 180. Upon assembly of tiles 70, 80 and 81 and floor strip 100, the tab fits into groove 91 and then the reducer is assembled in mating position between an edge 71 of tile 70 and the first side 61 of the second plane. The design of the tab and reducer prevents the reducer from laterally moving in relation to floor strip 100 in an assembled condition. Although a simple tongue and groove design is shown, other engagement means may be used (See FIGS. 9A-9F, discussed below) which have locking designs which lock the floor strip and reducer together. At each of these mating portions, glue may be used to additionally secure the components together. The reducers 90 (as well as the reducers of the subsequent described embodiments) may carry on an exposed outer surface a pot forming laminate (not shown) in a manner similar to that shown in FIGS. 1-4.

Figures 6B, 6C:
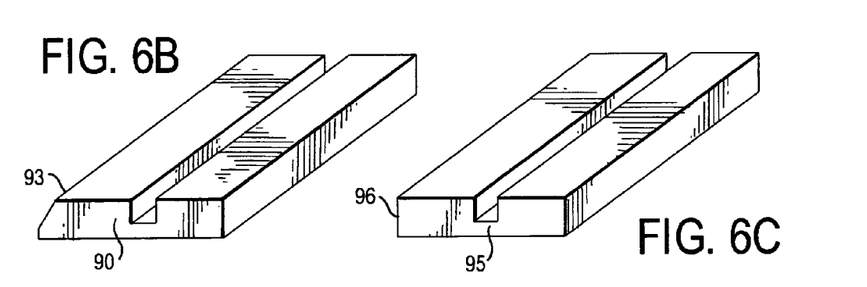

Reducer 90 may have alternate designs, which are illustrated in FIGS. 6B and 6C. Reducer 90, shown in FIGS. 5, 6A and 6B, has a sloped portion 93, which provides a more gradual transition between a tiled floor section having a higher height than an adjacent floor tile section. On the other hand, Reducer 95, shown in FIG. 6C, has a vertical side 96, which would provide more of a small step between the different tile floor sections.

Figure 7A:
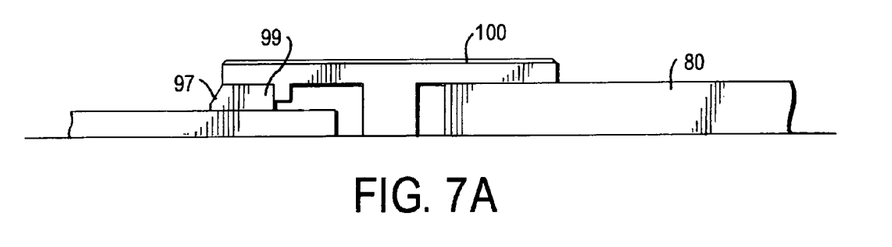
FIGS. 7A-7C illustrate an assembled view of a non-locking tab/reducer assembly.
Figure 7B:
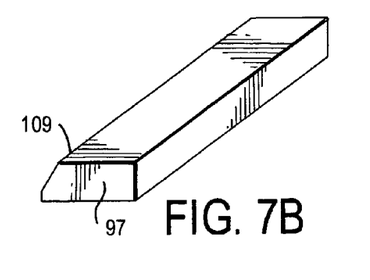
Figure 7C:
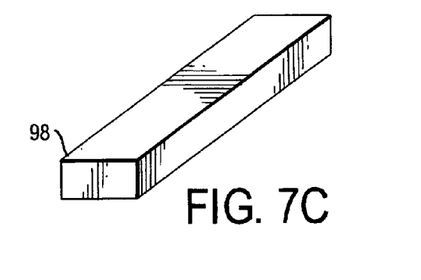

Another embodiment of the invention is shown in FIGS. 7A-7C, whereby instead of tab 180 locking into a reducer, it provides a back stop for a reducer 97 which does not have any groove. Other aspects of this embodiment are congruent to those of the previous embodiment and will not be repeated herein.

Reducer 97 is more or less a rectangular box design having one sloped side 109 which as in the previous embodiment provides a gradual transition between floor heights. Reducer 97 does not have a groove, rather the back side 99 is abutted against tab 180 when floor strip 100 and reducer 97 are in their assembled positions, as shown in FIG. 7A. A glue or other adhesive may be used to maintain the parts in their positions and prevent reducer 97 from laterally moving in relation to floor strip 100. Alternatively, reducer 98 may be used in place of reducer 97. Reducer 98 has a rectangular box shape which provides a step between floor heights rather than in a sloped fashion.

Figure 8:
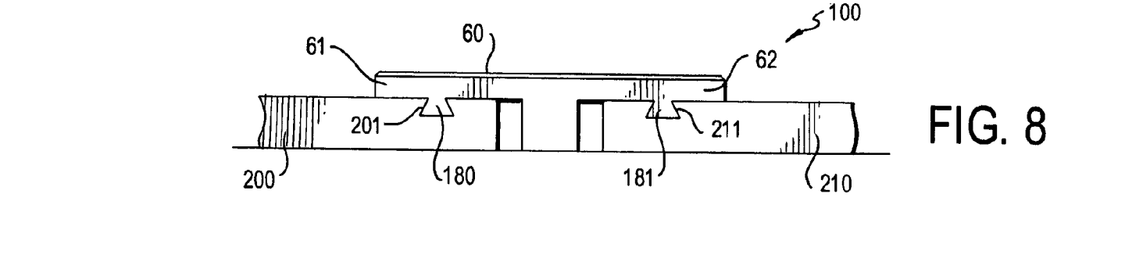
FIG. 8 illustrates an assembled view of a dilatation profile having two tab portions locking with edge panels.

A further embodiment of the invention is shown in FIG. 8. In this embodiment, floor strip 100 is used between two adjacent floor tile sections having similar heights. Further, both first side 61 and second side 62 of the second plane 60 have tabs 180 and 181, respectively. Tiles 200 and 210 have grooves 201 and 211 respectively. Tabs 180 and 181 fit into grooves 201 and 211 by a tongue and groove style, however, other engagement styles may be used (See FIGS. 9A-9F below) which either positively lock the parts together or simple provide a guide for assembly. Such a design does not require the use of a reducer between the tile and the floor strip.

Figure 9:
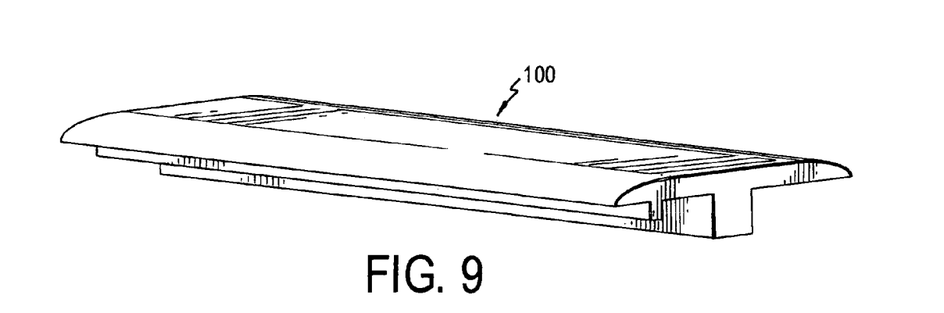
FIG. 9 shows a perspective view of the invention according to one embodiment of the invention.

The tab and reducer groove need not be a simple tongue and groove design, as outlined in FIGS. 5-8. These were described merely by way of example using floor strip 100 with tab portion 180 as shown in FIG. 9. Alternatives of the tab on the floor strip in conjunction with a reducer are shown in FIGS. 10-14. Additionally, the reducers described in conjunction with the invention as a spacer between uneven floor tiles is not necessary. Should the tiles have similar height, a reducer may be removed and such slots which are described in the reducer may also be cut into the appropriate floor tile for positive locking or prevention of associated movement.

Figure 10A:
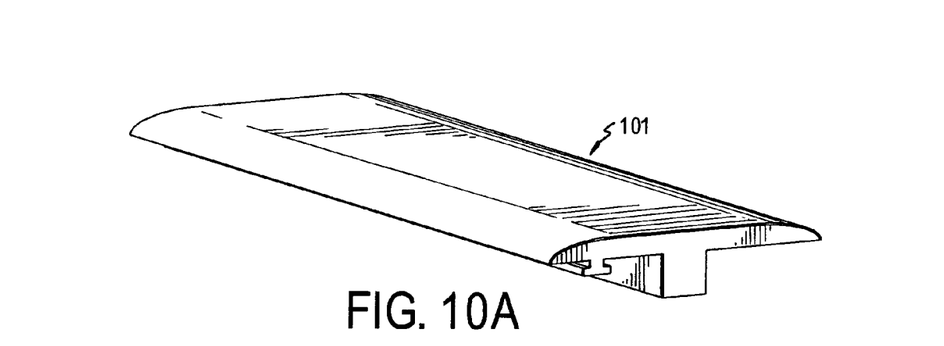
FIGS. 10-14 illustrate tab designs according to other embodiments of the invention.
Figure 10B:
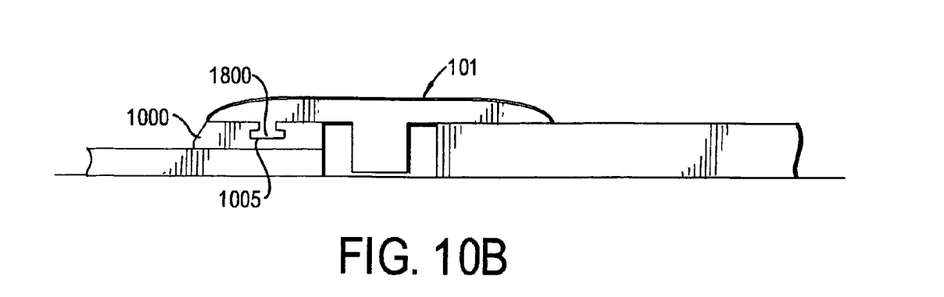

In FIG. 10A, a tab 1800 on floor strip 101 has the shape of a t-nut. An associated reducer 1000 has a shape similar to the t-nut cut through its longitudinal length thereof. Tab 1800 fits into the reducer 1000 by sliding the tab into an end portion of the reducer and along the length of the reducer. Such a design allows for a positive locking in a lateral direction while allowing movement along the longitudinal axis of the floor strip.

Figure 11A:
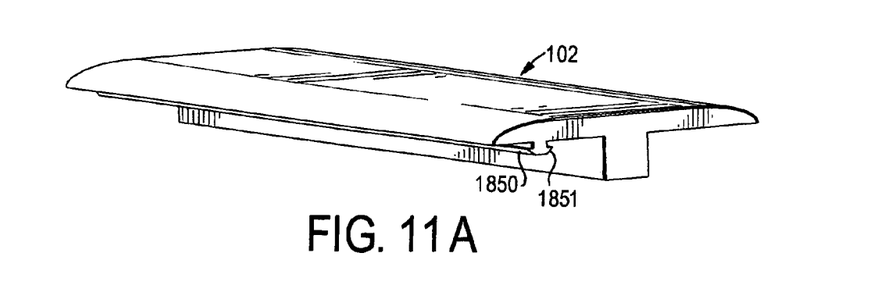
Figure 11B:
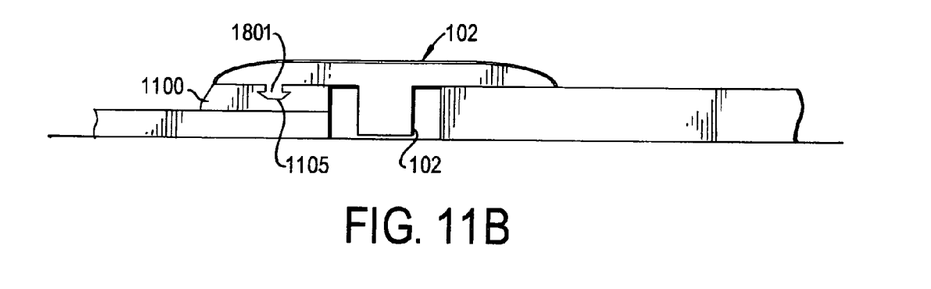
Figure 12A:
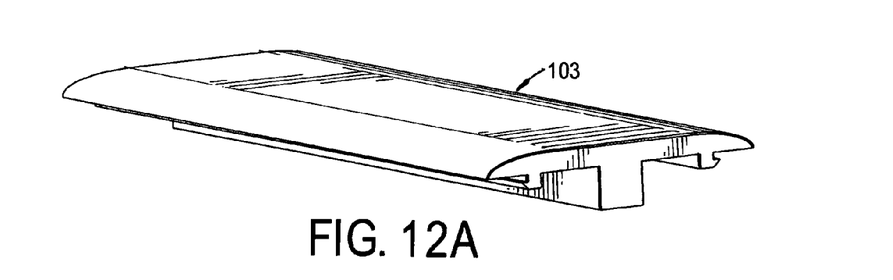
Figure 14A:
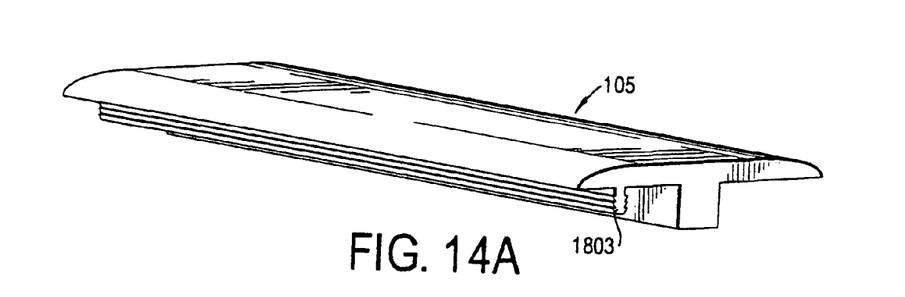
Figure 14B:
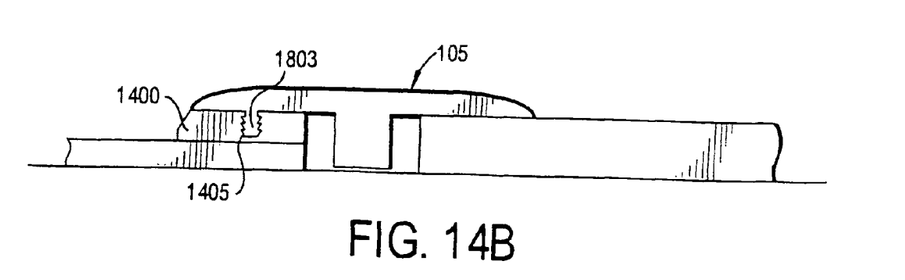

The designs of the tab portion as shown in FIGS. 11A, 12A and 14A show a tab portion that snaps into the associated reducer. In FIG. 11A, a tab 1800 of floor strip 102 has a pair of upwardly facing angled teeth 1850 and 1851. A reducer 1100 used in association with tab 1800 has a slot 1105 cut there through having an opening congruent to the design of the tab. When tab 1800 and reducer 1100 are assembled together, floor strip 102 is placed atop the reducer. Upon sufficient pressure on the floor strip, tabs 1801 will snap into the slot 1105. Teeth 1850 and 1851 prevent tab 1801 from being removed from slot 1105 of reducer 1100 providing a positive locking together.

Figure 12B:
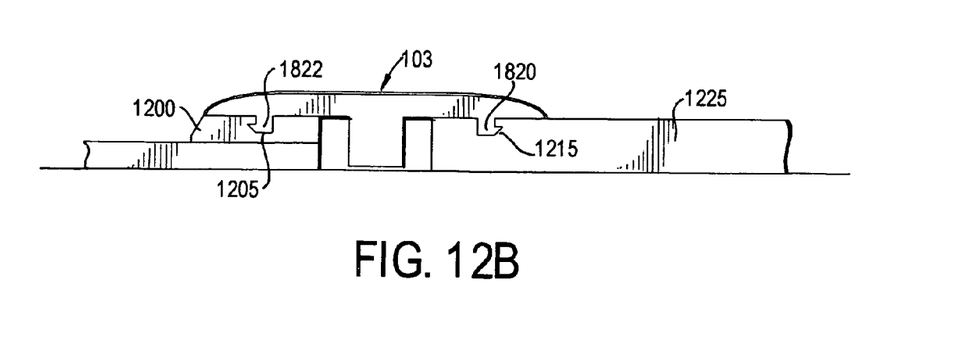

Tabs 1802, 1820 and 1803 shown in FIGS. 12A and 14A, have a similar design for the upwardly facing teeth as shown in FIG. 11A, but have a differing number of teeth. Similarly, reducers 1200 and 1400, used in association with these tabs respectively, also have slots 1205 and 1405 which are congruent to the associated tabs. A tile 1225 also has a slot near its edge for acceptance of the tab 1820. Each slot design allows for the tab portion to be snapped into the associated slot for a positive locking between the tab and the slot. Although the slot drawn in these figures has a shape congruent to the shape of the associated tab, such is not required. The slot must only be of sufficient design whereby the tab can snap into the slot and whereby the design of the slot prevents removal of the tab. FIG. 12B also shows a floor strip 103 having a pair of tabs whereby the tabs snap into both a reducer and the associated tile. However, such a specific case is not required. Floor strip 103 may be snapped into a pair of tiles or a pair of reducers.

Figure 13A:
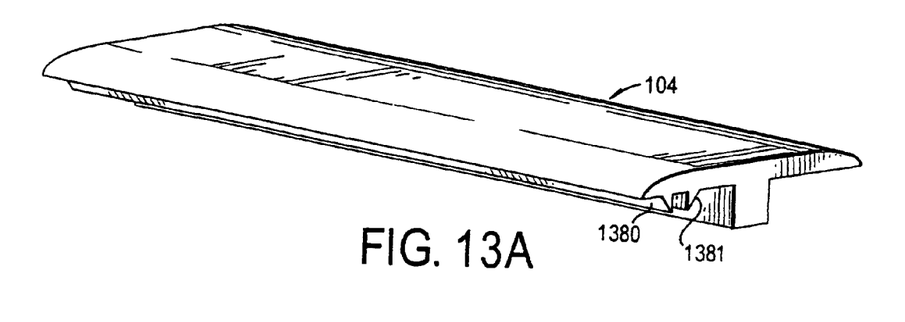
Figure 13B:
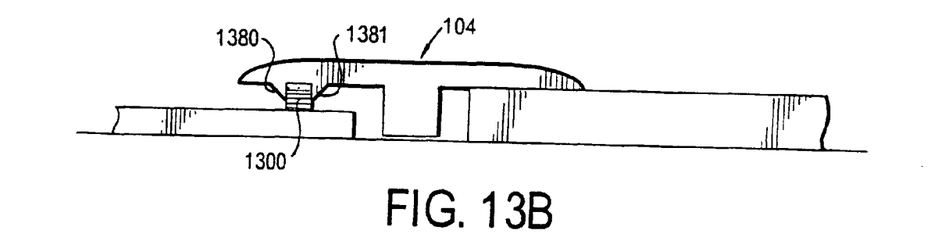

In FIG. 13A, a floor strip 104 has a pair of spaced tabs 1380 and 1381 having a generally triangular profile and extending along the length of the floor strip. Tabs 1380 and 1381 provide a channel by which reducer 1300 is held between the tabs under floor strip 104. Such a design prevents lateral movement of reducer 1300 in relation to floor strip 104.

Although the present invention has been described and illustrated in detail, such explanation is to be clearly understood that the same is by way of illustration and example only, and is not to be taken by way of limitation. Other modifications of the above examples may be made by those having ordinary skill which remain within the scope of the invention. For instance, the examples are described with reference to a dilatation profile for the carrier of the floor strip. However, such tab and reducer designs work just as well with a finishing profile as well as a transition profile, and whether used on carpet or floor tiles.

We claim:

1. An assembly comprising:
a floor having a decorative pattern; and
a floor strip comprising:
a first molding element, the first molding element comprising:
a longitudinal carrier comprising an upper section having a decorative pattern on an upper surface thereof; and a foot depending from the upper surface the decorative pattern comprising at least one monochromatic or patterned paper sheet and hard particles, which particles impart an abrasion resistance to the floor strip;
wherein the decorative pattern of the floor strip is the same as the decorative pattern of the floor; and, a second molding element, where the second molding element is connected to the upper section of the first molding element through a tongue and groove joint.

2. The assembly of claim 1, wherein the decorative pattern is selected from the group consisting of wood and marble.

3. The assembly of claim 1, wherein the decorative pattern is a phantasy pattern.

4. The assembly of claim 1, wherein the floor is a laminate floor.

5. The assembly of claim 1, wherein the paper sheet is part of a thermosetting laminate and the thermosetting laminate further comprises at least a second paper layer.

6. The assembly of claim 5, wherein the tongue-and-groove joint is formed in-part by a groove in the second molding element.

7. The assembly of claim 1, wherein the longitudinal carrier has a T-shape; with at least one downwardly depending tab on the same side of the carrier as the foot.

8. The assembly of claim 7, wherein the tongue-and-groove joint is formed in-part by a groove in the second molding element.

9. The assembly of claim 7 where there are two downwardly depending tabs.

10. The assembly of claim 1, wherein the longitudinal carrier has a T-shape.

11. The assembly of claim 10, wherein:
the upper section comprises:
a first member extending to one side of the foot;
a second member extending to one side of the foot, and, wherein the groove of the tongue and groove joint is in the shape of a large base distal an under surface of at least one of the first and second members.

12. The assembly of claim 11, further comprising a securing element, sized and shaped to engage the foot of the first molding element.

13. The assembly of claim 1, wherein the floor strip is a floor profile selected from the group consisting of a dilitation profile, a transition profile and a finishing profile.

14. The assembly of claim 1, wherein groove is in the second molding element.

15. The assembly of claim 1, wherein the tongue-and-groove joint is formed in-part by a tab depending from the upper section of the first molding element.

16. The assembly of claim 1 where the longitudinal carrier is formed of a waterproof material.

17. An assembly comprising:
a floor having a decorative pattern; and
a floor strip comprising:
a first molding element comprising:
a longitudinal carrier comprising fiber board and having an upper section and a foot depending therefrom, the upper section comprising a decorative pattern; the decorative pattern comprising a paper and hard particles imparting an abrasion resistance;
wherein the decorative pattern of the floor strip is the same as the decorative pattern of the floor; and a second molding element, when the second molding element is connected to the upper section of the first molding element through a tongue and groove joint.

18. The assembly of claim 17, wherein the fiber board is high density fiber board.

19. The assembly of claim 17, wherein the hard particles are at least one selected from the group consisting of silica, aluminium oxide and silicon carbide.

20. The assembly of claim 17, wherein the decorative pattern of the first molding element comprises a paper in the form of a laminate comprising at least one monochromatic or patterned paper sheet and hard particles, which particles impart an abrasion resistance to the floor strip.

21. The assembly of claim 20, wherein the thermosetting laminate further comprises at least a second paper layer.

22. The assembly of claim 17, wherein the decorative pattern is selected from the group consisting of wood and marble.

23. The assembly of claim 17, wherein the decorative pattern is a phantasy pattern.

24. The assembly of claim 17, wherein the floor is a laminate floor.

25. The assembly of claim 17, wherein the longitudinal carrier has a T-shape, with at least one downwardly depending tab on the same side of the carrier as the foot.

26. The assembly of claim 17, wherein the longitudinal carrier has a T-shape.

27. The assembly of claim 17, wherein the floor strip is a floor profile selected from the group consisting of a dilitation profile, a transition profile and a finishing profile.

28. The assembly of claim 27, wherein the first molding element has a T-shape.

29. The assembly of claim 17, wherein the tongue-and-groove joint is formed in-part by a tab depending from the first molding element.

30. The assembly of claim 29, wherein the tongue-and-groove joint is formed in-part by a groove in the second molding element.

31. The assembly of claim 17, wherein the tongue-and-groove joint is formed in-part by a groove in the second molding element.

32. The assembly of claim 17, wherein:
   the first molding element further comprises:
      a first member extending to one side of the foot;
      a second member extending to one side of the foot, and, wherein the groove is in the shape of a large base distal an under surface of at least one of the first and second members.

33. The assembly of claim 32, further comprising a securing element, sized and shaped to engage the foot of the first molding element.

* * * * *